United States Patent
Wei et al.

(10) Patent No.: US 11,865,518 B2
(45) Date of Patent: Jan. 9, 2024

(54) METHOD FOR MANUFACTURING ELECTROLESS PLATING SUBSTRATE AND METHOD FOR FORMING METAL LAYER ON SURFACE OF SUBSTRATE

(71) Applicant: National Tsing Hua University, Hsinchu (TW)

(72) Inventors: Tzu-Chien Wei, Hsinchu (TW); Yu-Hsiang Kao, New Taipei (TW)

(73) Assignee: NATIONAL TSING HUA UNIVERSITY, Hsinchu (TW)

(*) Notice: Subject to any disclaimer, the term of this patent is extended or adjusted under 35 U.S.C. 154(b) by 573 days.

(21) Appl. No.: 17/075,130

(22) Filed: Oct. 20, 2020

(65) Prior Publication Data

US 2021/0046455 A1 Feb. 18, 2021

Related U.S. Application Data

(63) Continuation of application No. 16/133,935, filed on Sep. 18, 2018, now Pat. No. 10,828,624.

(30) Foreign Application Priority Data

Oct. 20, 2017 (TW) .................................. 106136175

(51) Int. Cl.
*C23C 18/18* (2006.01)
*B01J 23/44* (2006.01)
(Continued)

(52) U.S. Cl.
CPC ........... *B01J 23/44* (2013.01); *B01J 31/0238* (2013.01); *B01J 31/0254* (2013.01);
(Continued)

(58) Field of Classification Search
CPC .... B01J 23/44; B01J 31/0238; B01J 31/0254; B01J 31/0274; B01J 31/0275; B01J 31/06;
(Continued)

(56) References Cited

U.S. PATENT DOCUMENTS

2009/0162681 A1 6/2009 Kolics
2016/0163567 A1 6/2016 Wei et al.

FOREIGN PATENT DOCUMENTS

CN 1403628 A 3/2003
CN 101970352 A 2/2011
(Continued)

OTHER PUBLICATIONS

Fernanda Parra Da Silva, et al. "Tuning the Catalytic Activity and Selectivity of Pd Nanoparticles Using Ligand-Modified Supports and Surfaces;" Sep. 20, 2017; «ACS Omega», vol. 2, p. 6016.

*Primary Examiner* — Katherine A Bareford
*Assistant Examiner* — Christina D McClure
(74) *Attorney, Agent, or Firm* — Li & Cai Intellectual Property (USA) Office

(57) ABSTRACT

The instant disclosure provides a method for manufacturing an electroless plating substrate and a method for forming a metal layer on a surface of a substrate. The method for preparing the electroless plating substrate includes: providing a substrate; attaching a self-adsorbed catalyst composition to a surface of the substrate; and performing an electroless metal deposition for forming an electroless metal layer on the surface of the substrate. The self-adsorbed catalyst composition includes a colloidal nanoparticle and a silane compound. The colloidal nanoparticle includes a palladium nanoparticle and a capping agent enclosing the palladium nanoparticle. The silane compound has at least one amino group to interact with the colloidal nanoparticle. A covalent bond between the silane compound and the
(Continued)

surface of the substrate is formed through the at least one silane group of the silane compound. The colloid nanoparticle has a particle size ranging from 5 to 10 nanometers.

20 Claims, 8 Drawing Sheets

(51) Int. Cl.
*B01J 31/02* (2006.01)
*B01J 35/00* (2006.01)
*B01J 31/06* (2006.01)
*B01J 37/02* (2006.01)
*B01J 37/03* (2006.01)
*C23C 18/20* (2006.01)
*C23C 18/30* (2006.01)
*B01J 37/04* (2006.01)
*B01J 37/08* (2006.01)
*C23C 18/34* (2006.01)

(52) U.S. Cl.
CPC ....... *B01J 31/0274* (2013.01); *B01J 31/0275* (2013.01); *B01J 31/06* (2013.01); *B01J 35/006* (2013.01); *B01J 35/0013* (2013.01); *B01J 37/0209* (2013.01); *B01J 37/031* (2013.01); *C23C 18/1831* (2013.01); *C23C 18/1879* (2013.01); *C23C 18/206* (2013.01); *C23C 18/30* (2013.01); *B01J 31/0204* (2013.01); *B01J 37/04* (2013.01); *B01J 37/08* (2013.01); *C23C 18/34* (2013.01)

(58) Field of Classification Search
CPC .. B01J 35/0013; B01J 35/006; B01J 37/0209; B01J 37/031; B01J 31/0204; B01J 37/04; B01J 37/08; C23C 18/1831; C23C 18/1879; C23C 18/206; C23C 18/30; C23C 18/34
See application file for complete search history.

(56) References Cited

FOREIGN PATENT DOCUMENTS

| | | |
|---|---|---|
| CN | 104685098 A | 6/2015 |
| CN | 104742438 A | 7/2015 |
| JP | 2012216722 A | 11/2012 |
| TW | 200616712 A | 6/2006 |

METHOD FOR MANUFACTURING ELECTROLESS PLATING SUBSTRATE AND METHOD FOR FORMING METAL LAYER ON SURFACE OF SUBSTRATE

CROSS REFERENCE TO RELATED APPLICATION

This application is a continuation application of U.S. application Ser. No. 16/133,935, filed on Sep. 18, 2018, and entitled "SELF-ADSORBED CATALYST COMPOSITION, METHOD FOR PREPARING THE SAME AND METHOD FOR MANUFACTURING ELECTROLESS PLATING SUBSTRATE", the entire contents of which are hereby incorporated by reference.

BACKGROUND

1. Technical Field

The instant disclosure relates to a method for manufacturing an electroless plating substrate and a method for forming a metal layer on a surface of a substrate, and in particular, to a method for manufacturing an electroless plating substrate and a method for forming a metal layer on a surface of a substrate by using a self-adsorbed catalyst composition.

2. Description of Related Art

In the technical field of forming a metalized substrate by electroless plating processes, generally a palladium catalyst is used during the electroless metal deposition process. For example, a tin-palladium colloid (an acidic Sn/Pd colloid) or a basic ionic palladium catalyst can be used for performing the electroless metal deposition process. The commercially available palladium catalysts mentioned above have pros and cons respectively. For example, the tin ions located on the outer side of the acidic Sn/Pd colloid may be oxidized when contacting with air, and hence, the acidic Sn/Pd colloid has the disadvantage of instability. Therefore, the parameters of the washing process after the catalyst being activated should be carefully selected for preventing the formation of $Sn(OH)_2$ or $Sn(OH)_4$ colloids, thereby ensuring the low-roughness of the chemical copper layer formed thereafter. In addition, the pH range for the use of the basic ionic palladium catalyst is narrow, i.e., if the pH is too low, precipitations are likely to occur and if the pH is too high, the activation of the catalyst will be affected.

Therefore, there is a need for improved catalysts for electroless plating processes and method for manufacturing electroless plating substrates.

SUMMARY

The object of the instant disclosure is to provide a self-adsorbed catalyst composition with the capabilities of grafting and catalyzing in one step. The self-adsorbed catalyst composition may be used to metalize the surface of the substrate by performing a single dipping process on the substrate.

An embodiment of the instant disclosure provides a method for manufacturing an electroless plating substrate including providing a substrate; attaching a self-adsorbed catalyst composition to a surface of the substrate; and performing an electroless metal deposition for forming an electroless metal layer on the surface of the substrate. The self-adsorbed catalyst composition includes a colloidal nanoparticle and a silane compound. The colloidal nanoparticle includes a palladium nanoparticle and a capping agent enclosing the palladium nanoparticle. The silane compound interacts with the colloidal nanoparticle through an amino group, and a covalent bond between the silane compound and the surface of the substrate is formed through a silane group of the silane compound. The colloid nanoparticle has a particle size ranging from 5 to 10 nanometers.

Another embodiment of the instant disclosure provides a method for manufacturing an electroless plating substrate including providing a substrate; attaching a self-adsorbed catalyst composition to a surface of the substrate; and performing an electroless metal deposition for forming an electroless metal layer on the surface of the substrate. The self-adsorbed catalyst composition includes a colloidal nanoparticle and a silane compound. The colloidal nanoparticle includes a palladium nanoparticle and a capping agent enclosing the palladium nanoparticle. The silane compound has at least one amino group. The colloid nanoparticle has a particle size ranging from 5 to 10 nanometers.

Yet another embodiment of the instant disclosure a method for forming a metal layer on a surface of a substrate including attaching a self-adsorbed catalyst composition to the surface of the substrate, and performing an electroless metal deposition for forming the metal layer on the surface of the substrate. The self-adsorbed catalyst composition includes a colloidal nanoparticle and a silane compound. The colloidal nanoparticle includes a palladium nanoparticle and a capping agent enclosing the palladium nanoparticle. The silane compound has at least one amino group. The colloid nanoparticle has a particle size ranging from 5 to 10 nanometers.

An advantage of the instant disclosure is that the method for manufacturing the electroless plating substrate and the method for forming a metal layer on a surface of a substrate provided by the instant disclosure could achieve the object of forming an electroless plating metallization substrate through an environmental-friendly and convenient process. In addition, strong adhesion between the electroless plating metal layer and the substrate may be achieved.

In order to further understand the techniques, means and effects of the instant disclosure, the following detailed descriptions and appended drawings are hereby referred to, such that, and through which, the purposes, features and aspects of the instant disclosure may be fully appreciated; however, the appended drawings are merely provided for reference and illustration, without any intention to be used for limiting the instant disclosure.

BRIEF DESCRIPTION OF THE DRAWINGS

The accompanying drawings are included to provide a further understanding of the instant disclosure, and are incorporated in and constitute a part of this specification. The drawings illustrate exemplary embodiments of the instant disclosure and, together with the description, serve to explain the principles of the instant disclosure.

DESCRIPTION OF THE EXEMPLARY EMBODIMENTS

Figure 1:
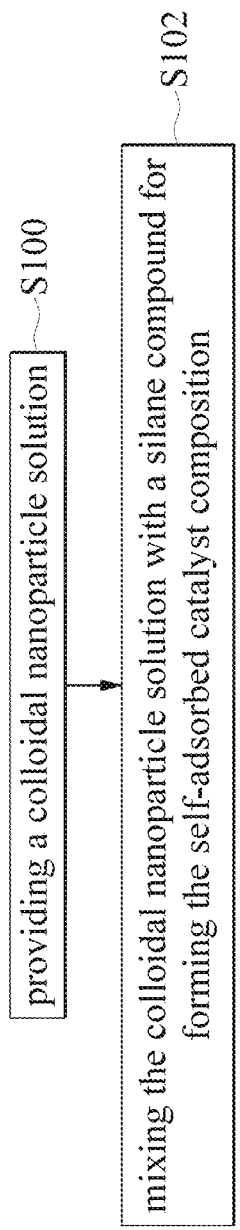
FIG. 1 is a flow chart of a method for preparing a self-adsorbed catalyst composition provided by the embodiment of the instant disclosure.

Reference will now be made in detail to the exemplary embodiments of the instant disclosure, examples of which are illustrated in the accompanying drawings. Wherever possible, the same reference numbers are used in the drawings and the description to refer to the same or like parts.

Figure 2:
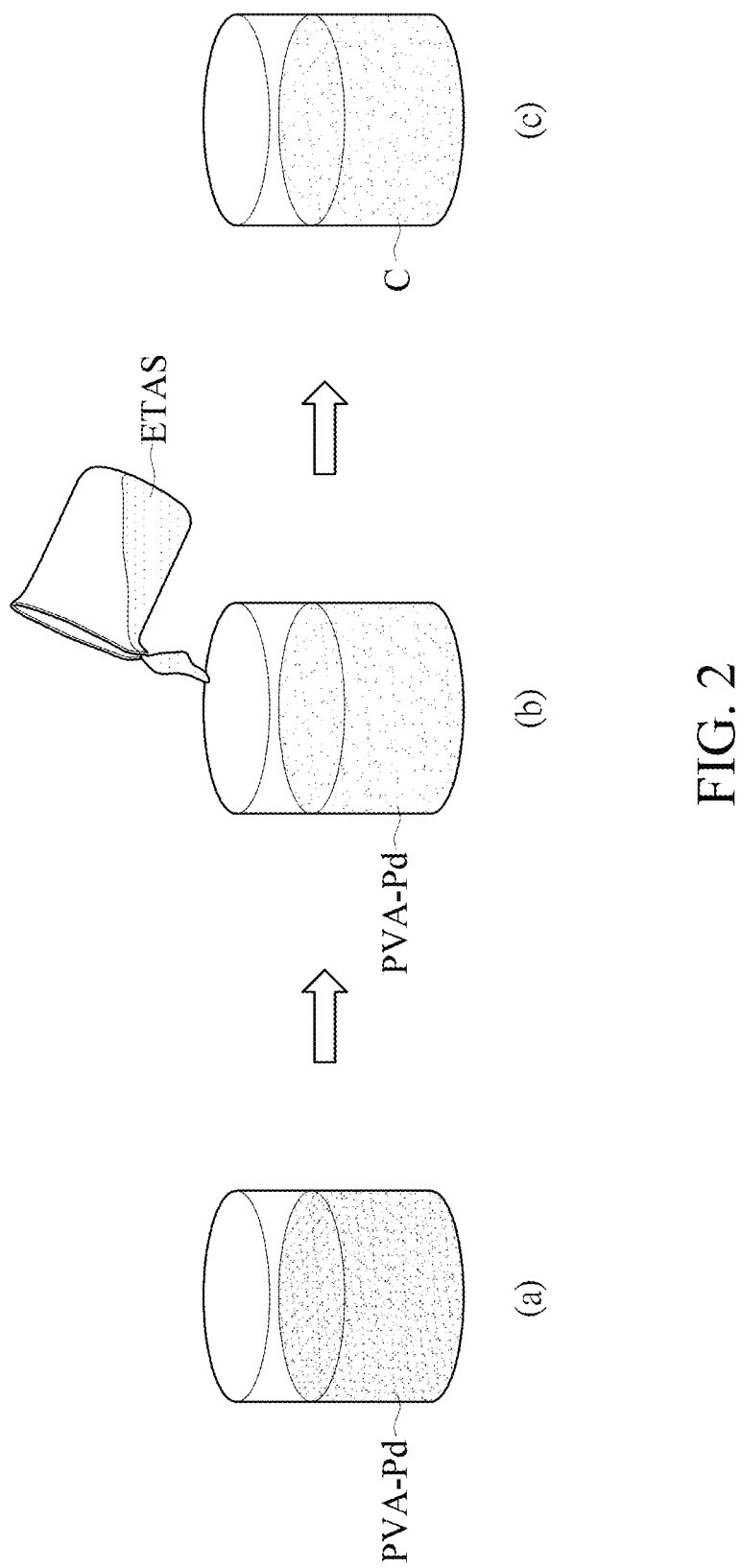
FIG. 2 is a schematic view of step S100 and step S102 of FIG. 1.

Reference is made to FIG. 1 and FIG. 2. FIG. 1 is a flow chart of a method for preparing a self-adsorbed catalyst composition provided by the embodiment of the instant disclosure, and FIG. 2 is a schematic view of step S100 and step S102 of the method for preparing a self-adsorbed catalyst composition provided by the embodiment of the instant disclosure. Specifically, the method for preparing the self-adsorbed catalyst composition provided by the embodiment of the instant disclosure includes the following steps: providing a colloidal nanoparticle solution (step S100); and mixing the colloidal nanoparticle solution with a silane compound for forming the self-adsorbed catalyst composition (step S102). The colloidal nanoparticle includes a palladium nanoparticle and a capping agent enclosing the palladium nanoparticle.

Step S100 is shown in part (a) in FIG. 2. Step S100 includes providing the colloidal nanoparticle solution. In the embodiment of the instant disclosure, the colloidal nanoparticle solution may be prepared by a wet process. Specifically, the wet process includes reducing the metal precursor capped by the capping agent through a reducing agent. In an implementation, the metal precursor (such as palladium nitrate $Pd(NO_3)_2 \cdot 2H_2O$) is dissolved in the solvent (such as water), and the capping agent is added into the solution including the metal precursor for enabling the capping agent (such as a polymer) enclosing the metal precursor. Subsequently, the reducing agent (such as formaldehyde) and basic solution (such as sodium carbonate solution) are added, and stirring is performed at room temperature for reducing the metal precursor to form metal atoms. In order to prevent palladium nanoparticle from precipitating during the process for preparing the self-adsorbed catalyst composition, the weight ratio between the metal precursor and the capping agent (such as polyvinyl alcohol) may range from about 1:1 to 1:5.

The capping agent used in the embodiments of the instant disclosure can be selected from the group consisting of trimethoxysilylpropyl modified polyethylenimine, polyvinyl alcohol (PVA), polyvinylpyrrolidone (PVP), poly(acrylic acid) (PAA), and any combination thereof. In the following description, a colloidal nanoparticle containing the palladium nanoparticle (represented by Pd) enclosed by the capping agent (polyvinyl alcohol, PVA) and represented as PVA-Pd is taken as an example. In the PVA-Pd, the terminal groups of the PVA polymer may provide molecular steric hindrance in the solvent and could effectively prevent the colloidal nanoparticle from aggregation or precipitation.

In addition, since the molecular weight of the capping agent would affect the proportion of the capping agent adsorbed on the surface of the palladium nanoparticle, in a preferred implementation, the capping agent can be a polymer having a molecular weight from 5,000 to 10,000. Specifically, compared with a polymer with smaller molecular weight, more amount of the polymer could be adsorbed on the surface of the palladium nanoparticle for a polymer with larger molecular weight. Therefore, the amount of the capping agent surrounding the palladium nanoparticle is more, and the capping agent forms a layer of capping agent with greater thickness, and hence, the colloidal nanoparticle may have a larger particle size. In an implementation of the instant disclosure, the colloidal nanoparticle has a particle size ranging from 5 to 10 nanometers.

Generally, the colloidal nanoparticle solution formed by the wet process described above may have a PVA-Pd concentration of about 2,500 ppm. Next, the colloidal nanoparticle solution is diluted for synthesizing the self-adsorbed catalyst composition. The dilution may be performed by adding de-ionized water to the PVA-Pd concentration and stirring the solution for 10 to 40 minutes (for example, half an hour). In the embodiments of the instant disclosure, the concentration of the colloidal nanoparticle (PVA-Pd) in the colloidal nanoparticle solution may range from 50 to 500 ppm. It is possible that if the concentration of the PVA-Pd in the solution is lower than 50 ppm, the PVA-Pd may be less likely to interact with the silane compound, and if the concentration of the PVA-Pd in the solution is too high, for example, higher than 500 ppm, some portion of the PVA-Pd may precipitate during the following synthesizing steps. In a preferred embodiment of the instant disclosure, the concentration of the colloidal nanoparticle ranges from 50 to 200 ppm.

Next, step S102 is shown in (b) and (c) of FIG. 2. In step S102, the colloidal nanoparticle solution and the silane compound is mixed for forming the self-adsorbed catalyst composition C. In the embodiment of the instant disclosure, the silane compound can be a silane compound having 1 to 3 amino groups. In addition, the silane compound can be selected from the group consisting of: (3-aminopropyl) triethoxysilane (APS), N-(2-aminoethyl-3-aminopropyl) trimethoxysilane, N-(6-aminohexyl)aminomethyltriethoxysilane, 3-[2-(2-aminoethylamino)ethylamino]propyl-trimethoxysilane (ETAS), N-(2-aminoethyl-3-aminopropyl) trimethoxysilane (EDA) and any combination thereof. In the following description, ETAS is taken as an example of the silane compound.

In step S102, the ETAS is added into the colloidal nanoparticle solution provided by step S100. Based on the total amount of the colloidal nanoparticle solution and the silane compound (ETAS), the amount of the silane compound (ETAS) ranges from 0.5 to 5 volume percent (v/v %). It is noted that, if the volume percent of ETAS is less than 0.5, for example, 0.1, the colloidal nanoparticles (PVA-Pd) may completely precipitate after ETAS is added into the PVA-Pd solution. In addition, if the volume percent of ETAS is higher than 5 vol. %, for example, 10 vol. %, some of the palladium nanoparticles may precipitate. In a preferred embodiment of the instant disclosure, 50 ppm of PVA-Pd solution is used, and 0.5 to 5 volume percent of ETAS is used for preparing the self-adsorbed catalyst composition C.

For example, after adding 1 volume percent of ETAS into 50 ppm of PVA-Pd solution, the colloidal nanoparticle solution (PVA-Pd solution) and the silane compound (ETAS) may be stirred for a time ranging from 1.5 to 4.5 hours (for example, 3 hours). After step S102 is completed, ETAS interacts with the colloidal nanoparticle (PVA-Pd) through an amino group. Specifically, the amino group of ETAS would interact with the palladium particle in the PVA-Pd solution or with the palladium ion in the solution. Therefore, step S102 could produce the self-adsorbed catalyst composition C (ETAS-PVA-Pd) dispersed in the solution.

It is noted that although PVA is used as the capping agent in the above description, the self-adsorbed catalyst composition C may also be obtained by adding 1 volume percent of ETAS into 50 ppm of PVP-Pd colloidal nanoparticle solution. In other words, the type of capping agent is not limited to the specific examples illustrated in the instant disclosure.

Figure 3:
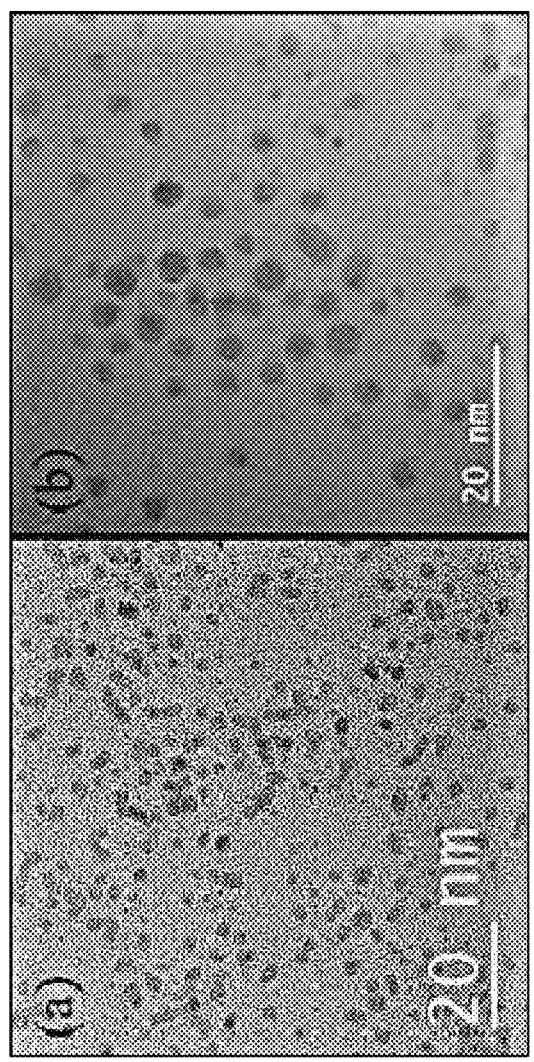
FIG. 3 is a transmission electron micrograph of a self-adsorbed catalyst composition provided by the embodiment of the instant disclosure.

Reference is made to FIG. 3. FIG. 3 is a transmission electron micrograph of a self-adsorbed catalyst composition provided by the embodiments of the instant disclosure. To be more specific, pictures (a) and (b) in FIG. 3 are the TEM micrographs of the self-adsorbed catalyst composition C (ETAS-PVA-Pd) and the colloidal nanoparticle (PVA-Pd) and show the comparison of particle sizes of the two materials. As shown in FIG. 3, the particle size of the self-adsorbed catalyst composition C (ETAS-PVA-Pd) is uniformly distributed in the range of from 2 to 5 nanometers (nm). Similarly, PVA-Pd has a similar particle size range. Therefore, the addition of ETAS and the combination of ETAS and PVA-Pd do not substantially change the particle size of PVA-Pd, indicating that PVA still functions as a capping agent of Pd nanoparticles, and the addition of ETAS does not affect the property of suspension for the colloidal nano particle solution.

The self-adsorbed catalyst composition obtained by the method provided by the instant disclosure includes the colloidal nanoparticle (such as PVA-Pd) and the silane compound (such as ETAS), and the colloidal nanoparticle includes the palladium nanoparticle (Pd) and the capping agent (such as PVA) enclosing the palladium nanoparticle. In addition, the silane compound has at least an amino group (for example, ETAS has three amino groups), and the amino group is used for interacting with the colloidal nanoparticle.

Figure 4:
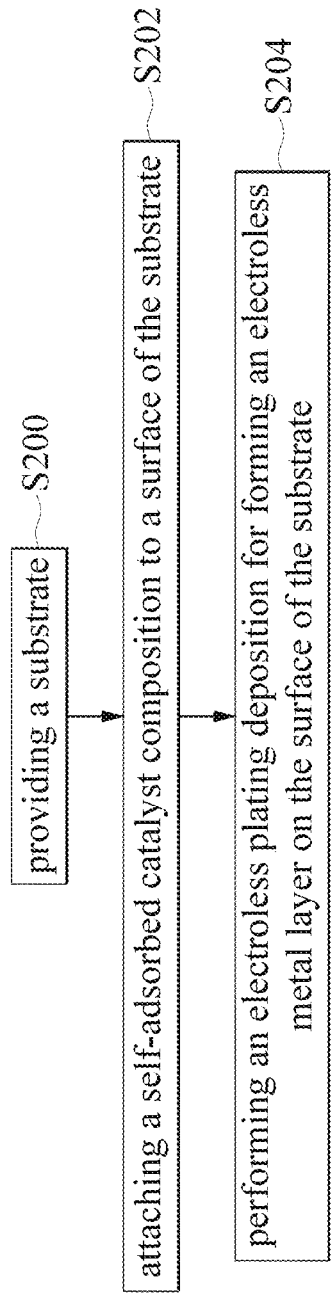
FIG. 4 is a flow chart of the method for preparing a self-adsorbed catalyst composition provided by the embodiment of the instant disclosure.
Figure 5:
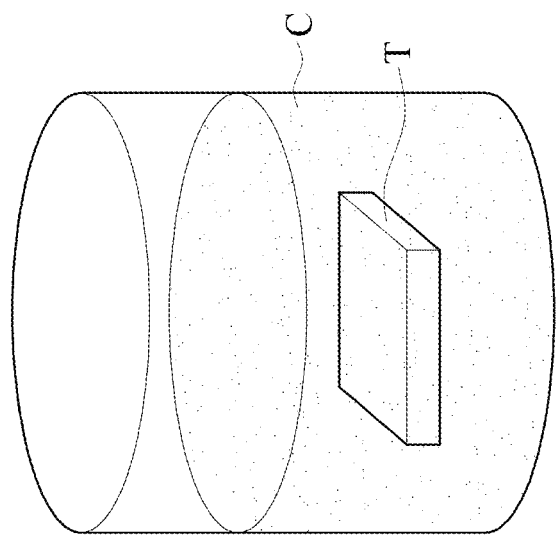
FIG. 5 is a schematic view of the step S202 of FIG. 4.

In addition, the instant disclosure provides a method for manufacturing an electroless plating substrate. Reference is made to FIG. 4 and FIG. 5. FIG. 4 is a flow chart of the method for preparing a self-adsorbed catalyst composition provided by the embodiments of the instant disclosure, and FIG. 5 is a schematic view of one of the steps of the method for manufacturing an electroless plating substrate provided by the embodiments of the instant disclosure.

As shown in FIG. 4, the method for manufacturing the electroless plating substrate includes: providing a substrate (step S200); attaching a self-adsorbed catalyst composition to a surface of the substrate (step S202); and performing an electroless plating deposition for forming an electroless metal layer on the surface of the substrate (step S204). It should be noted that the self-adsorbed catalyst composition includes colloidal nanoparticles and a silane compound, in which the colloidal nanoparticles includes a palladium nanoparticle and a capping agent enclosing the palladium nanoparticle. The silane compound interacts with the colloidal nanoparticle through an amino group, and generates a covalent bond with the surface of the substrate through a silane group.

Specifically, the substrate T provided in step S200 may be a silicon substrate such as a glass substrate (a $SiO_2$ substrate). However, the substrate T may also be a substrate made of other materials. In other words, the type of the substrate T is not limited to any specific examples illustrated in the instant disclosure. As shown in FIG. 5, in step S202, the self-adsorbed catalyst composition C (such as ETAS-PVA-Pd) is attached to the surface of the substrate T. The surface of the substrate T is the surface that is intended to undergo the electroless plating metal deposition in the subsequent step.

For example, in an embodiment of the instant disclosure, the substrate T is an alkali free glass substrate (which could be commercially available from Corning Corporation). The glass substrate is cleaned following a standard RCA ($NH_4OH:H_2O_2:H_2O$) treatment in advance, and de-ionized water is used to rinse the substrate T for removing impurities. Next, the glass substrate is immersed into an ETAS-PVA-Pd solution at room temperature for 5 minutes for activating the surface of the substrate T. In other words, in step S202, the substrate is immersed into a solution containing the self-adsorbed catalyst composition C (ETAS-PVA-Pd).

After the surface of the substrate T is activated, the silane group of the silane compound in the self-adsorbed catalyst composition C generates Si—O—Si covalent bond with the surface of the substrate T. Therefore, the amino group and the silane group of the silane compound in the self-adsorbed catalyst composition C could be respectively used for being coupled to the colloidal nanoparticles with catalytic function and the surface of the substrate T for activating the substrate T.

Lastly, in step S204, an electroless plating metal deposition process is performed for forming an electroless plating metal layer on the surface activated by the self-adsorbed catalyst composition C of the substrate T. The electroless plating metal deposition process may be referred to as autocatalytic plating. Such a process involves forming a metal surface with catalytic function on the surface of the object or utilizing the catalytic function on the surface of the object, and transforming metal ions into metal by chemical reduction. In an implementation of the instant disclosure, the electroless plating metal deposition is an electroless plating nickel deposition process, i.e., the electroless plating metal layer formed on the substrate T is a nickel metal layer. In this implementation, sodium hypophosphite ($NaH_2PO_2$) may be used as the reducing agent of the electroless plating nickel deposition. In an environment with higher temperature, unstable hypophosphite ions releases hydrogen atoms which are adsorbed by the catalysts, thereby initiating the electroless plating reaction for forming the electroless plating nickel metal layer on the surface of the substrate T.

Figure 6:
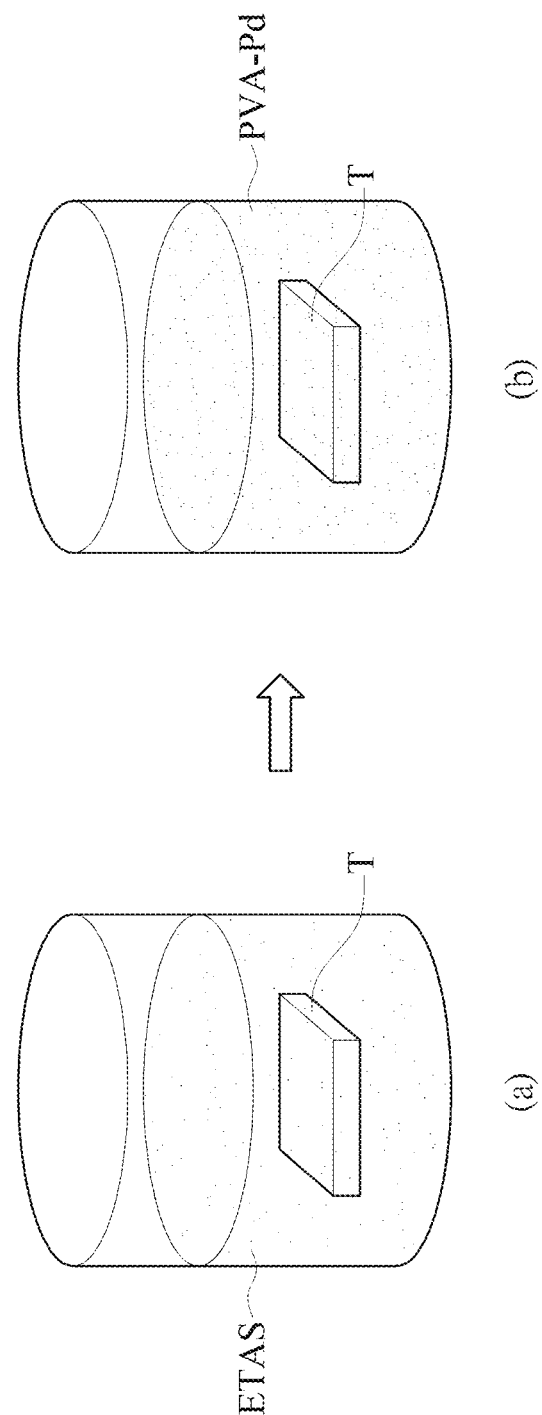
FIG. 6 is a schematic view showing the steps of a method for manufacturing an electroless plating substrate in the existing art.
Figure 7:
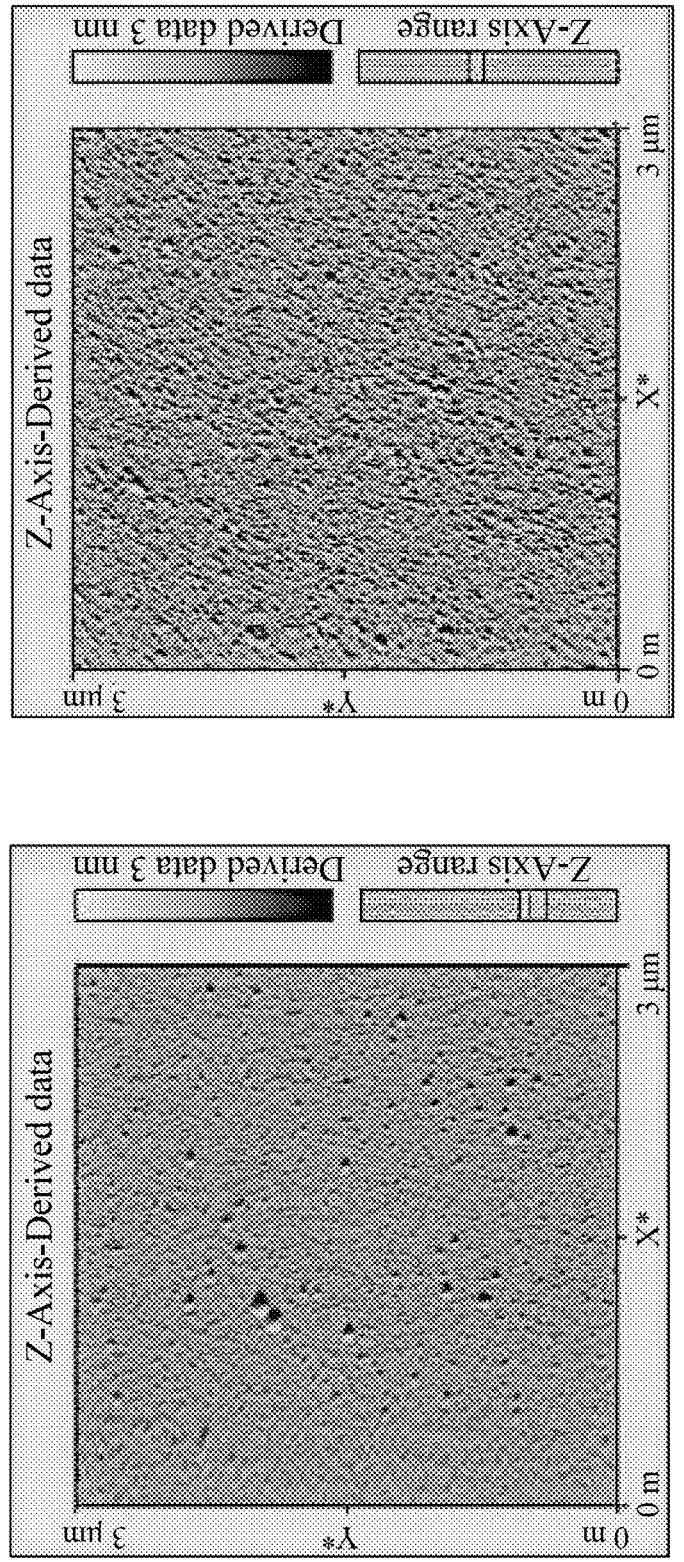
FIG. 7 shows images of the surfaces of the substrates formed by the method for manufacturing the electroless plating substrate provided by the instant disclosure and in the existing art obtained by atomic force microscope.
Figure 8:
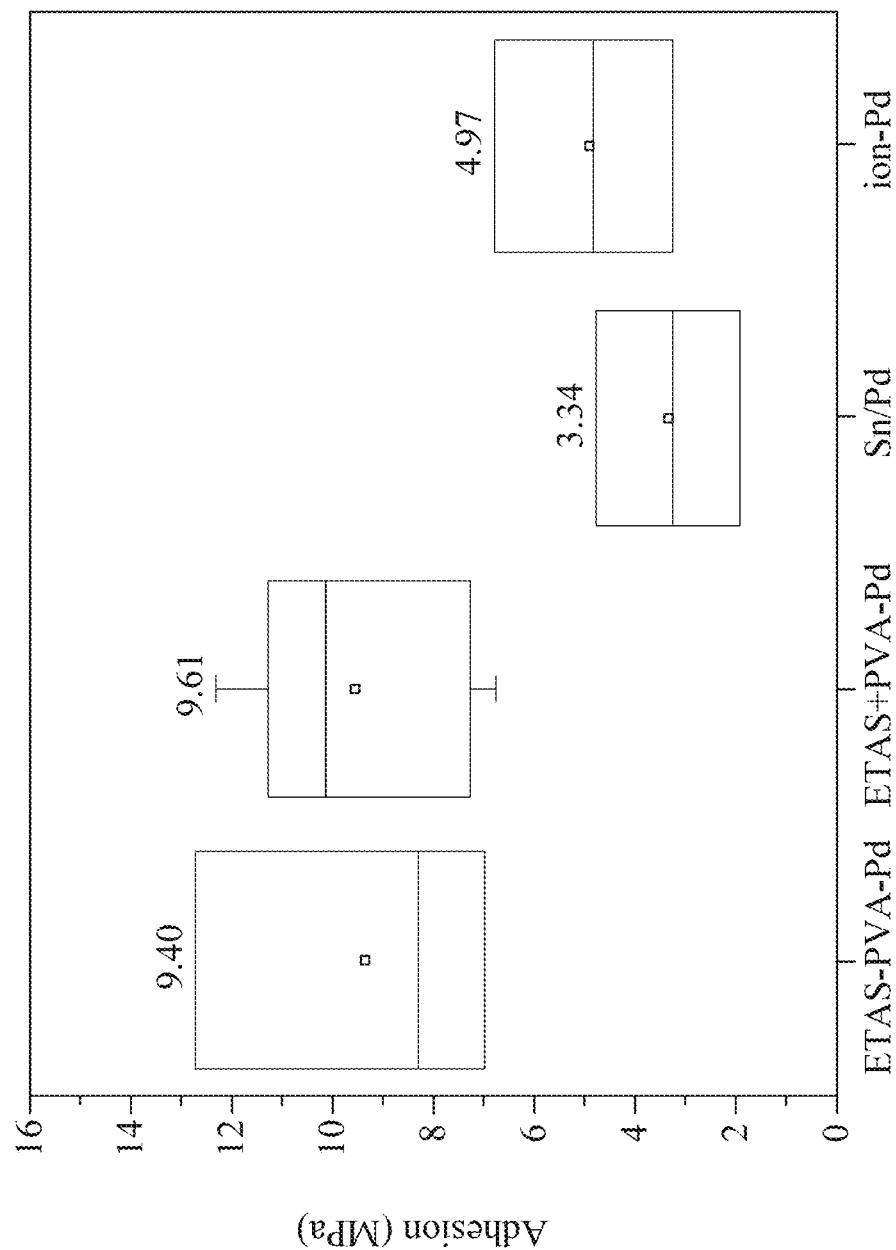
FIG. 8 shows testing results of the adhesion between the substrate and metal layer obtained by the method provided by the instant disclosure and the method in the existing art.

The method for manufacturing the electroless plating substrate provided by the instant disclosure and a method for manufacturing the electroless plating substrate in the existing art are compared in the following description. Reference is made to FIG. 6 to FIG. 8. FIG. 6 is a schematic view showing the steps of a method for manufacturing an electroless plating substrate in the existing art, FIG. 7 shows pictures of the surfaces of the substrates formed by the method for manufacturing the electroless plating substrate provided by the instant disclosure and in the existing art obtained by atomic force microscope, and FIG. 8 shows testing results of the adhesion between the substrate and metal layer obtained by the method provided by the instant disclosure and the method in the existing art.

As shown in FIG. 6, the main difference between the method in the existing art and the method provided by the instant disclosure is that the former includes a first step of using silane compound to modify the surface of the substrate T, and a second step of disposing the colloidal nanoparticle on the surface modified by the silane compound. On the other hand, the method provided by the embodiment of the instant disclosure only employs a single step for attaching the self-adsorbed catalyst composition C (containing the silane compound and the colloidal nanoparticle) onto the surface of the substrate T.

In FIG. 6, the glass substrate is first immersed into a solution containing the silane compound ETAS for 30 minutes. Afterwards, the glass substrate with modified surface is immersed into a solution containing the colloidal nanoparticles (PVA-Pd). It is noted that FIG. 6 only depicts a simplified preparing process, and in more details, the glass substrate may be immersed into pure isopropanol solution (99.5% IPA) for 5 minutes for pre-treating the substrate, then the glass substrate is immersed into the IPA solution containing ETAS for attaching ETAS onto the surface of the glass substrate. The silanation of the surface of the glass substrate by ETAS is completed by baking the substrate with 160° C. for 30 minutes. Next, the surface-modified glass substrate is subjected to the step for attaching colloidal nanoparticles.

Unlike the method in the existing art, the method provided by the instant disclosure only employs a single step to achieve the object of activation the surface of the substrate T. Specifically, the method provided by the embodiments of the instant disclosure may include pre-treating the glass substrate by sulfuric acid of 5M molar concentration for 5 minutes, then directly immersing the glass substrate into a solution containing the self-adsorbed catalyst composition C (ETAS–PVA-Pd). Therefore, the method provided by the embodiments of the instant disclosure is relatively simple. For the convenience of the description, the method in the existing art is referred to as the two-step ETAS+PVA-Pd process.

Reference is made to FIG. 7. Part (a) of FIG. 7 shows the picture of the surface of the substrate having attached catalysts formed by the two-step ETAS+PVA-Pd process, and part (b) of FIG. 7 shows the picture of the surface of the substrate obtained by the method provided by the embodiments of the instant disclosure. Both of the methods employ a square glass substrate with the dimension of 2*2 centimeters as the substrate T. As shown in FIG. 7, the glass substrate obtained by the two-step ETAS+PVA-Pd process has a relatively loose catalyst (Pd) loading, and some Pd nanoparticle aggregations are observed. On the other hand, the glass substrate obtained by the method provided by the embodiments of the instant disclosure (the ETAS-PVA-Pd process) through the self-adsorbed catalyst composition C has relatively dense and uniformly distributed catalyst loading, and hence, is of benefit to the quality of the electroless plating metal layer formed subsequently.

Next, after forming the substrate with activated surface (having catalyst composition attached thereto), the substrate T is immersed into commercial Ni—P bath with 85° C. for 1 minute for carrying out the electroless plating metal deposition. The formed Ni—P film has a thickness of about 120 nm. A peeling-adhesion test is used to measure the differences between the method in the existing art and the method provided by the instant disclosure.

Reference is made to FIG. 8. FIG. 8 shows the testing results of the method provided by the instant disclosure (presented as ETAS-PVA-Pd), the two-step ETAS+PVA-Pd process (presented as ETAS+PVA-Pd), the use of Sn/Pd (presented as Sn/Pd) and the use of ionic palladium catalyst (presented as ionic Pd) of the existing art. Each method is tested for three times.

As shown in FIG. 8, compared to the electroless plating processes using commercial Sn/Pd catalyst and ionic Pd catalyst, the method provided by the embodiments of the instant disclosure and the two-step ETAS+PVA-Pd process in the existing art obviously have better adhesion testing results. Specifically, the adhesion is increased from 3 to 5 MPa to more than 9 MPa. The above result proves that the method provided by the embodiments of the instant disclosure could obtain an electroless plating metal layer with excellent adhesion. Moreover, since the method of the embodiments of the instant disclosure only employs a single step for producing a substrate with activated surface, it is simpler, more cost-effective and suitable for industrial application when compared to the two-step ETAS+PVA-Pd process.

Effectiveness of the Instant Disclosure

An advantage of the instant disclosure is that the self-adsorbed catalyst composition C, the method for preparing the self-adsorbed catalyst composition C and the method for manufacturing the electroless plating substrate provided by the instant disclosure could achieve the object of forming an electroless plating metallization substrate through an environmental-friendly and convenient process. In addition, the excellent adhesion between the electroless plating metal layer and the substrate is ensured.

Specifically, the self-adsorbed catalyst composition C provided by the instant disclosure could be prepared by a relatively convenient process, and since it has both the functions of grafting and catalyzing, the technical effect desired by two independent steps in the existing art could now be achieved in one step. Therefore, in the method for manufacturing the electroless plating substrate, there is no need to carry out additional surface modification or treatments for obtaining the activated surface of the substrate T. Moreover, the use of the self-adsorbed catalyst composition C for the method for manufacturing the electroless plating substrate could ensure the uniformity of the metal catalytic particle during the activation of the surface of the substrate T, and also bring forth the electroless plating substrate with excellent adhesion between the electroless plating metal layer and the substrate T without compromising the environment and the cost.

The above-mentioned descriptions represent merely the exemplary embodiment of the present disclosure, without any intention to limit the scope of the instant disclosure thereto. Various equivalent changes, alterations or modifications based on the claims of the instant disclosure are all consequently viewed as being embraced by the scope of the instant disclosure.

What is claimed is:

1. A method for manufacturing an electroless plating substrate, including:
   providing a substrate;
   attaching a self-adsorbed catalyst composition to a surface of the substrate, wherein the self-adsorbed catalyst composition includes a colloidal nanoparticle and a silane compound, the colloidal nanoparticle includes a palladium nanoparticle and a capping agent enclosing the palladium nanoparticle, and the silane compound has at least one amino group to interact with the colloidal nanoparticle, a covalent bond between the silane compound and the surface of the substrate is formed through a silane group of the silane compound, and the colloid nanoparticle has a particle size ranging from 5 to 10 nanometers; and performing an electroless metal deposition for forming an electroless metal layer on the surface of the substrate.

2. The method according to claim 1, wherein, the step of attaching the self-adsorbed catalyst composition to the surface of the substrate further includes: immersing the substrate into a solution containing the self-adsorbed catalyst composition.

3. The method according to claim 2, wherein the method further includes: the substrate is pre-treated by sulfuric acid and then immersed into the solution containing the self-adsorbed catalyst composition.

4. The method according to claim 1, wherein the capping agent is selected from the group consisting of polyethamine capped by trimethoxysilyl, polyvinyl alcohol, polyvinylpyrrolidone, polyacrylic acid, and any combination thereof.

5. The method according to claim 1, wherein the silane compound is selected from the group consisting of: (3-aminopropyl)triethoxysilane, N-aminoethyl-3-(3-aminopropyl)triethoxysilane, N-(6-aminohexyl) aminomethyltriethoxysilane, 3-[2-(2-aminoethylamino)ethylamino]propyltrimethoxysilane, N-(2-aminoethyl-3-aminopropyl)trimethoxysilane and any combination thereof.

6. The method according to claim 1, wherein the silane compound has 1 to 3 amino groups.

7. The method according to claim 1, wherein the self-adsorbed catalyst composition is prepared by steps of:
providing a colloidal nanoparticle solution including the colloidal nanoparticle and a solvent;
mixing the colloidal nanoparticle solution with the silane compound for forming the self-adsorbed catalyst composition.

8. The method according to claim 7, wherein the colloidal nanoparticle solution is prepared by a wet process, and the wet process includes steps of:
dissolving a metal precursor in the solvent to form a solution;
adding the capping agent into the solution for enabling the capping agent enclosing the metal precursor; and
reducing the metal precursor by a reducing agent to obtain the colloidal nanoparticle solution.

9. The method according to claim 8, wherein a weight ratio between the metal precursor and the capping agent ranges from about 1:1 to 1:5.

10. The method according to claim 7, wherein the colloidal nanoparticle is presented in the colloidal nanoparticle solution in an amount of from 50 to 200 ppm.

11. The method according to claim 7, wherein the silane compound is presented in an amount of from 0.5 to 5 vol. % based on the total volume of the colloidal nanoparticle solution and the silane compound.

12. The method according to claim 7, wherein the step of mixing the colloidal nanoparticle solution with the silane compound further includes stirring the colloidal nanoparticle solution and the silane compound for a time ranging from 1.5 to 4.5 hours.

13. The method according to claim 1, wherein the electroless metal layer is a nickel metal layer.

14. A method for manufacturing an electroless plating substrate, including:
providing a substrate;
attaching a self-adsorbed catalyst composition to a surface of the substrate, wherein the self-adsorbed catalyst composition includes a colloidal nanoparticle and a silane compound, the colloidal nanoparticle includes a palladium nanoparticle and a capping agent enclosing the palladium nanoparticle, and the silane compound has at least one amino group, and the colloid nanoparticle has a particle size ranging from 5 to 10 nanometers; and
performing an electroless metal deposition for forming an electroless metal layer on the surface of the substrate.

15. The method according to claim 14, wherein the method further includes: the substrate is pre-treated by sulfuric acid and then immersed into a solution containing the self-adsorbed catalyst composition; wherein the self-adsorbed catalyst composition is formed by mixing a colloidal nanoparticle solution and the silane compound.

16. The method according to claim 15, wherein the silane compound is presented in an amount of from 0.5 to 5 vol. % based on the total volume of the colloidal nanoparticle solution and the silane compound.

17. A method for forming a metal layer on a surface of a substrate, including:
attaching a self-adsorbed catalyst composition to the surface of the substrate, wherein the self-adsorbed catalyst composition includes a colloidal nanoparticle and a silane compound, the colloidal nanoparticle includes a palladium nanoparticle and a capping agent enclosing the palladium nanoparticle, and the silane compound has at least one amino group, and the colloid nanoparticle has a particle size ranging from 5 to 10 nanometers; and
performing an electroless metal deposition for forming the metal layer on the surface of the substrate.

18. The method according to claim 17, wherein the method further includes: pre-treating the substrate with sulfuric acid and immersing the substrate into a solution containing the self-adsorbed catalyst composition.

19. The method according to claim 17, wherein the self-adsorbed catalyst composition is prepared by steps of:
providing a colloidal nanoparticle solution including the colloidal nanoparticle and a solvent;
mixing the colloidal nanoparticle solution with the silane compound for forming the self-adsorbed catalyst composition.

20. The method according to claim 19, wherein the silane compound is presented in an amount of from 0.5 to 5 vol. % based on the total volume of the colloidal nanoparticle solution and the silane compound.

* * * * *